United States Patent
Steinmacher-Burow (10) Patent No.: US 9,384,064 B2
(45) Date of Patent: Jul. 5, 2016

(54) MULTIPLE CORE PROCESSING WITH HIGH THROUGHPUT ATOMIC MEMORY OPERATIONS

(71) Applicant: GLOBALFOUNDRIES INC., Grand Cayman (KY)

(72) Inventor: Burkhard Steinmacher-Burow, Boeblingen (DE)

(73) Assignee: GlobalFoundries, Inc., Grand Cayman (KY)

(*) Notice: Subject to any disclaimer, the term of this patent is extended or adjusted under 35 U.S.C. 154(b) by 42 days.

(21) Appl. No.: 14/475,776

(22) Filed: Sep. 3, 2014

(65) Prior Publication Data

US 2015/0089145 A1   Mar. 26, 2015

(30) Foreign Application Priority Data

Sep. 25, 2013  (GB) .................................. 1317022.2

(51) Int. Cl.
*G06F 12/08* (2016.01)
*G06F 9/52* (2006.01)
*G06F 9/30* (2006.01)

(52) U.S. Cl.
CPC .............. *G06F 9/52* (2013.01); *G06F 9/3004* (2013.01)

(58) Field of Classification Search
CPC ............. G06F 12/084; G06F 12/0868; G06F 2212/6042; G06F 9/3004; G06F 9/52
USPC ..................................... 711/130, 118; 712/42
See application file for complete search history.

(56) References Cited

U.S. PATENT DOCUMENTS

| | | | |
|---|---|---|---|
| 6,112,293 A | 8/2000 | Witt | |
| 7,257,814 B1 | 8/2007 | Melvin et al. | |
| 7,743,232 B2 | 6/2010 | Shen et al. | |
| 7,853,951 B2 | 12/2010 | Rosenbluth et al. | |
| 8,356,160 B2 | 1/2013 | Muff et al. | |
| 2010/0332801 A1 | 12/2010 | Fryman et al. | |
| 2013/0117546 A1 | 5/2013 | Jacobi et al. | |

(Continued)

FOREIGN PATENT DOCUMENTS

WO   2010096263 A2   8/2010

OTHER PUBLICATIONS

IPO Search Report, Application No. GB1317002.2, Patents Act 1977: Search Report under Section 17(5), Date Mailed Feb. 18, 2014, pp. 1-3.

(Continued)

*Primary Examiner* — Jasmine Song
(74) *Attorney, Agent, or Firm* — Yuanmin Cai; Hoffman Warnick LLC (57) ABSTRACT

A processor comprising multiple processor cores and a bus for exchanging data between the multiple processor cores is disclosed. Each of the multiple processor cores includes: at least one processor register; a cache for storing at least one cache line of memory; a load store unit for executing a memory command to exchange data between the cache and the at least one processor register; an atomic memory operation unit for executing an atomic memory operation on the at least one cache line of memory; and a high throughput register for storing a status indicating a high throughput or a normal status. The load store unit is operable to transfer the atomic memory operation to the atomic memory operation unit of a designated processor core if the atomic memory operation status is the high throughput status using the bus.

13 Claims, 5 Drawing Sheets

(56) References Cited

U.S. PATENT DOCUMENTS

2014/0047205 A1* 2/2014 Frey .................. G06F 3/0668
711/163
2014/0267334 A1* 9/2014 Duluk, Jr. ........... G06F 11/0751
345/543

OTHER PUBLICATIONS

H. Hajimiri, et al., "Reliability Improvement in Multicore Architectures Through Computing in Embedded Memory," IEEE 54th International Midwest Symposium on Circuits and Systems (MWSCAS), Aug. 7-10, 2011, pp. 1-4.

* cited by examiner

MULTIPLE CORE PROCESSING WITH HIGH THROUGHPUT ATOMIC MEMORY OPERATIONS

FOREIGN PRIORITY

This application claims priority to Great Britain Patent Application No. 1317002.2, filed Sep. 25, 2013, and all the benefits accruing therefrom under 35 U.S.C. §119, the contents of which in its entirety are herein incorporated by reference.

BACKGROUND

The invention relates to multiple core processing, in particular to the processing of atomic memory operations.

Atomic memory operations are operations performed on a memory location such that only one operation at a time on this particular memory location can be performed at a time. In multiple core processors such atomic memory operations are typically performed on a cache line of memory. This may represent a bottle neck, because a cache line transfer across processor cores implies a one-to-many communication across cores. This is because a core requesting a cache line does not know which other core currently holds the cache line.

SUMMARY

In one embodiment, a processor comprising multiple processor cores and a bus configured to exchange data between the multiple processor cores, wherein each of the multiple processor cores includes at least one processor register; a cache configured to store at least one cache line of memory; a load store unit configured to execute a memory command to exchange data between the cache and the at least one processor register; an atomic memory operation unit configured to execute an atomic memory operation on the at least one cache line of memory; and a high throughput register configured to store a status that indicates a high throughput status or a normal status; wherein the load store unit is further operable to transfer the atomic memory operation to the atomic memory operation unit of a designated processor core selected from the multiple processor cores in the event the atomic memory operation status is the high throughput status, wherein the load store unit is further operable to transfer the atomic memory operation to the designated atomic memory operation unit using the bus.

In another embodiment, a method of operating a processor comprising multiple processor cores is disclosed. The processor includes a bus for exchanging data between the multiple processor cores, wherein each of the multiple processor cores comprises at least one processor register, each of the multiple processor cores further comprises a cache for storing at least one cache line of memory, each of the multiple processor cores further comprises a load store unit for executing a memory command to exchange data between the cache and the at least one processor register, each of the multiple processor cores further comprises an atomic memory operation unit for executing an atomic memory operation on the at least one cache line of memory, each of the multiple processor cores further comprises a high throughput register for storing a status that indicates a high throughput status or a normal status, the load store unit is further operable to transfer the atomic memory operation to the atomic memory operation unit of a designated processor core selected from the multiple processor cores in the event the atomic memory operation status is the high throughput status, the load store unit is further operable to transfer the atomic memory operation to the designated atomic memory operation unit using the bus. The method includes setting the status to the high throughput status on one or more of the multiple processor cores; issuing one or more atomic memory operations that operates on a memory address on the one or more of the multiple processor cores; and executing the one or more atomic memory operations using each of the one or more of the multiple processor cores.

BRIEF DESCRIPTION OF THE SEVERAL VIEWS OF THE DRAWINGS

In the following, exemplary embodiments of the invention will be described in greater detail by way of example only making reference to the drawings in which.

DETAILED DESCRIPTION

Embodiments of the invention provide for a processor, a method and a computer-readable storage medium in the independent claims. Additional embodiments are given in the dependent claims.

As will be appreciated by one skilled in the art, aspects of the present invention may be embodied as an apparatus, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are all examples of user interface components which enable the receiving of information or data from an operator.

In one aspect the invention provides for a processor comprising multiple processor cores and a bus for exchanging data between the multiple processor cores. A processor core as used herein encompasses a central processing unit. A processor with multiple processor cores encompasses a processor which contains two or more central processing units. Each of the multiple processor cores comprises at least one processor register. A processor register as used herein encompasses a register or a memory which is directly accessible within the processor core. For instance the processor register may be memory which is built into a particular processor core. Each of the multiple processor cores further comprises a cache for storing at least one cache line of memory. A cache line of memory as used herein encompasses a block of memory which is transferred from the memory of the computer to the cache of the processor.

Each of the multiple processor cores further comprises a load store unit for executing a memory command to exchange data between the cache and the at least one processor register. A load store unit as used herein encompasses a hardware component of a processor that loads or stores data back to or from main memory to registers in the processor. Typically a load store unit operates independently of the other components of a processor core. Each of the multiple processor cores further comprises an atomic memory operation unit for executing an atomic memory operation on the at least one cache line of memory. Atomic memory operation as used herein encompasses a memory operation which a processor or multiple cores can read a location and write to it at the same time in the same bus operation. Examples of an atomic memory operation include: fetchAndAdd, fetchAndXOR, swap, storeAdd. An atomic memory operation prevents any other processor or core from writing or reading the memory until the operation is complete. Each of the multiple processor cores further comprises a high throughput register for storing a status that indicates a high throughput status or a normal status. The high throughput register as used herein encompasses a register incorporated into the particular multiple processor core. The high throughput register is a type of processor register, however it is distinct from the at least one processor register. The load store unit is further operable to transfer the atomic memory operation to the atomic memory operation unit of a designated processor core selected from the multiple processor cores if the atomic memory operation status is the high throughput status. The designated processor core may be the same processor core or it may be a different processor core within the processor. The load store unit is further operable to transfer the atomic memory operation to the designated atomic memory operation unit using the bus. If however the designated processor core is the same processor core then the atomic memory operation does not need to be transferred using the bus.

This embodiment may be beneficial because, by transferring the atomic memory operation to the designated processor core, the atomic memory operations which operate a particular cache line of memory will be executed in the atomic memory operation unit of the designated processor core. This means that the cache line of memory does not need to be transferred between different processor cores to execute the atomic memory operations. This may drastically increase how quickly the processor can execute the atomic memory operations.

In existing processors, atomic memory operations for the cache line of memory may be distributed among the multiple cores. As these are atomic memory operations this particular cache line of memory needs to be moved from processor core to processor core. Use of the high throughput register enables a programmer to set the high throughput status for particular atomic memory operations. This particular arrangement also has the benefit that if the processor does not implement the high throughput register and the forwarding of the atomic memory operation the processor will still be able to function normally however at a slower speed. This means that this particular embodiment, the special code for executing the high throughput atomic memory operations will be backward compatible with existing processors.

Use of the high throughput register may speed up a high contention application scenario, where 2 or more processor cores concurrently issue atomic memory operations to the same cache line of memory. If the high throughput register is not used, the caches of the processor cores contend for the cache line. By using the high throughput register, the cache of the designated processor core can retain the cache line across the execution of multiple atomic memory operations from the multiple processor cores.

Use of the high throughput register may speed up an alternative application scenario, where 2 or more processor cores are using storeAdd or other store-like atomic memory operations to update multiple cache lines. By using the high throughput register, the cache of the designated processor core can retain a cache line across the execution of multiple atomic memory operations from multiple processor cores.

In other application scenarios, use of the high throughput register may slow down the application and thus should not be used. Use of the high throughput register typically results in an atomic memory operation executing in the atomic memory operation unit of another processor core, which can have a longer latency than an execution in the atomic memory operation unit local to the processor core. For example, in a low contention scenario, the memory cache line may be in the local cache and thus an atomic memory operation is fastest if executed by the local atomic memory operation unit.

In another embodiment the load store unit is further operable to check if a memory command is an atomic memory operation. The load store unit is further operable to detect the status. In this embodiment a further description of one way of implementing the processor is described.

In another embodiment the load store unit is further operable to detect the status if the memory command is an atomic memory operation. The load store unit is further operable to set the high throughput register to the normal status after detecting the status. In this embodiment the load store unit detects the status if the memory command is an atomic memory operation. If it is a normal or non-atomic memory operation then the status is not detected. After detecting the status the load store unit then sets the high throughput register to the normal status. That is to say in this embodiment the load store unit automatically resets the high throughput register to the normal status. This embodiment may be beneficial because the processor core can be programmed such that the high throughput status is set. The high throughput status remains set until an atomic memory operation is detected. If the high throughput status is detected then the atomic memory operation will be forwarded to the designated processor core and the high throughput register will be reset automatically to the normal status.

In some examples the high throughput register may be set to the normal status after the atomic memory operation is forwarded to the designated processor core.

In another embodiment the atomic memory operation is further operable to execute the memory command if the status is the normal status and the memory command is an atomic memory operation. In this embodiment the processor functions process the atomic memory operation without forwarding the atomic memory operation to the designated processor core.

In another embodiment the load store unit is operable to retrieve the at least one cache line of memory via the bus from a memory address specified in the memory command. The load store unit is further operable to determine the designated processor core by applying a function to the memory address. For example a hash function may be applied to the memory address. This embodiment may be beneficial because the function enables the processor core to determine which of the multiple processor cores is the designated processor core. This is done without a program or a compiler having to specify which of the processors is the designated processor core. For instance a function like a hash function could be developed which has a pseudo random distribution and effectively distributes the atomic memory operation to a designated processor core randomly but deterministically. In this way memory operations for a particular memory address are sent to the same designated processor core. This should lead to higher processing of atomic memory operations in high contention scenarios.

In another embodiment the high throughput register is operable for storing an atomic memory operation identifier for specifying the designated atomic memory operation unit. The load store unit is further operable to select the designated atomic memory operation unit using the atomic memory operation unit identifier. In this embodiment a programmer or a compiler can specify which of the multiple processor cores is the designated processor core. This may be useful for finally tailoring and making the executable code or atomic memory operations perform extremely efficiently. For instance the compiler can choose the designated processor core for particular memory addresses and distribute them deliberately amongst the multiple processor cores.

In another embodiment the load store unit is further operable to receive an identifier setting command. Execution of the identifier setting memory causes the load store unit to store the atomic memory operation unit identifier in the high throughput register. This may be useful, because a programmer or compiler can deliberately choose a particular atomic memory operation unit to execute atomic memory operations on a particular memory address.

In another embodiment the bus is operable for transferring multiple memory commands to the other atomic memory operation units in parallel. That is to say when there are a number of multiple processor cores they may all be able to transfer their atomic memory operations to the designated processor core simultaneously.

In another embodiment each of the multiple processor cores has multiple hardware threads. Each of the multiple processor cores is operable for implementing simultaneous multi-threading with the multiple hardware threads. Each of the multiple processor cores has a high throughput register dedicated to each of the multiple hardware threads.

In another embodiment the load store unit is further operable to receive a status setting memory command. Execution of the status setting memory command causes the load store unit to set the status to the high throughput status. A status setting memory command as used herein is a memory command. In some embodiments the identifier setting command is or acts as a status setting memory command.

This embodiment of a status setting memory command may be beneficial since it allows the atomic memory operation issued by the processor core to remain unchanged. In particular, the issued atomic memory operation need not be expanded to somehow distinguish between the normal status and the high throughput status. A small downside to this embodiment is that a context switch may cause the status setting memory command of the switched-out application thread to impact the atomic memory operation of the switched-in thread of another application. This expected infrequent scenario can cause a small performance degradation, but cannot impact the functional correctness of either application.

The status setting memory command is a no-operation command on an alternative implementation of the processor. The alternative implementation of the processor may be a processor that does not implement the high throughput register and is not operable for forwarding the atomic memory operation to the designated processor core. This embodiment may be beneficial because it enables code developed for the processor to be executed on processors that do not forward the atomic memory operation to the designated processor.

In another aspect the invention provides for a method of operating a processor comprising multiple processor cores. The processor comprises a bus for exchanging data between the multiple processor cores. Each of the multiple processor cores comprises at least one processor register. Each of the multiple processor cores further comprises a cache for storing at least one cache line of memory. Each of the multiple processor cores further comprises a load store unit for executing a memory command to exchange data between the cache and the at least one processor register.

Each of the multiple processor cores further comprises an atomic memory operation unit for executing an atomic memory operation on the at least one cache line of memory. Each of the multiple processor cores further comprises a high throughput register for storing a status that indicates a high throughput status or a normal status. The load store unit is further operable to transfer the atomic memory operation to the atomic memory operation unit of a designated processor core selected from the multiple processor cores if the atomic memory operation status is the high throughput status. The load store unit is further operable to transfer the atomic memory operation to the designated atomic memory operation unit using the bus. The method comprises the step of setting the status to the high throughput status on one or more of the multiple processor cores. This for instance may be accomplished by a processor core executing a command which causes the status to be set to the high throughput status.

The method further comprises the step of issuing an atomic memory operation or one or more atomic memory operations that operates on a memory address on the one or more of the multiple processor cores. The method further comprises the step of executing the atomic memory operation or the one or more atomic memory operations using each of the one or more of the multiple processor cores. The memory address refers to memory which is contained within the at least one cache line of memory. The one or more atomic memory operations that are each executed by the one or more of the multiple processor cores may be separate atomic memory operations or they may be the same atomic memory operation. A commonality is that they all operate on the same particular at least one cache line of memory or memory location within the at least one cache line of memory. The one or more atomic memory operations may be distributed amongst one or several of the multiple processor cores.

In another aspect the invention provides for a computer-readable storage medium comprising compiler instructions for execution by a computer system. The compiler instructions cause the computer to generate processor instructions for execution by a processor according to an embodiment. The processor instructions may instructions for execution by a processor according to an embodiment.

Execution of the compiler instructions causes the computer system to receive program data. Program data as used herein comprises data which may be used to compile executable code. This program data may be object code or for instance a text file containing a program written by a programmer. The program data specifies the status setting memory command before issuing a multi-thread atomic memory operation. Execution of the instructions further causes the computer system to compile the program data into the processor instructions. This embodiment may be beneficial because it generates computer code which may be executed by a processor according to an embodiment and it will set the high throughput register to the high throughput status such that the atomic memory operation is forwarded to the designated processor core. As such the computer-readable storage medium generates processor instructions which cause the processor to or may enable the processor to execute atomic memory operations more rapidly. Processor instructions as used herein encompass instructions or commands for execution by the processor comprising the multiple processor cores.

In another aspect the invention provides for processor instructions compiled by a computer-readable storage medium and computer system according to an embodiment.

It is understood that one or more of the aforementioned embodiments of the invention may be combined as long as the combined embodiments are not mutually exclusive.

In the following, like numbered elements in these figures are either similar elements or perform an equivalent function. Elements which have been discussed previously will not necessarily be discussed in later figures if the function is equivalent.

Figure 1:
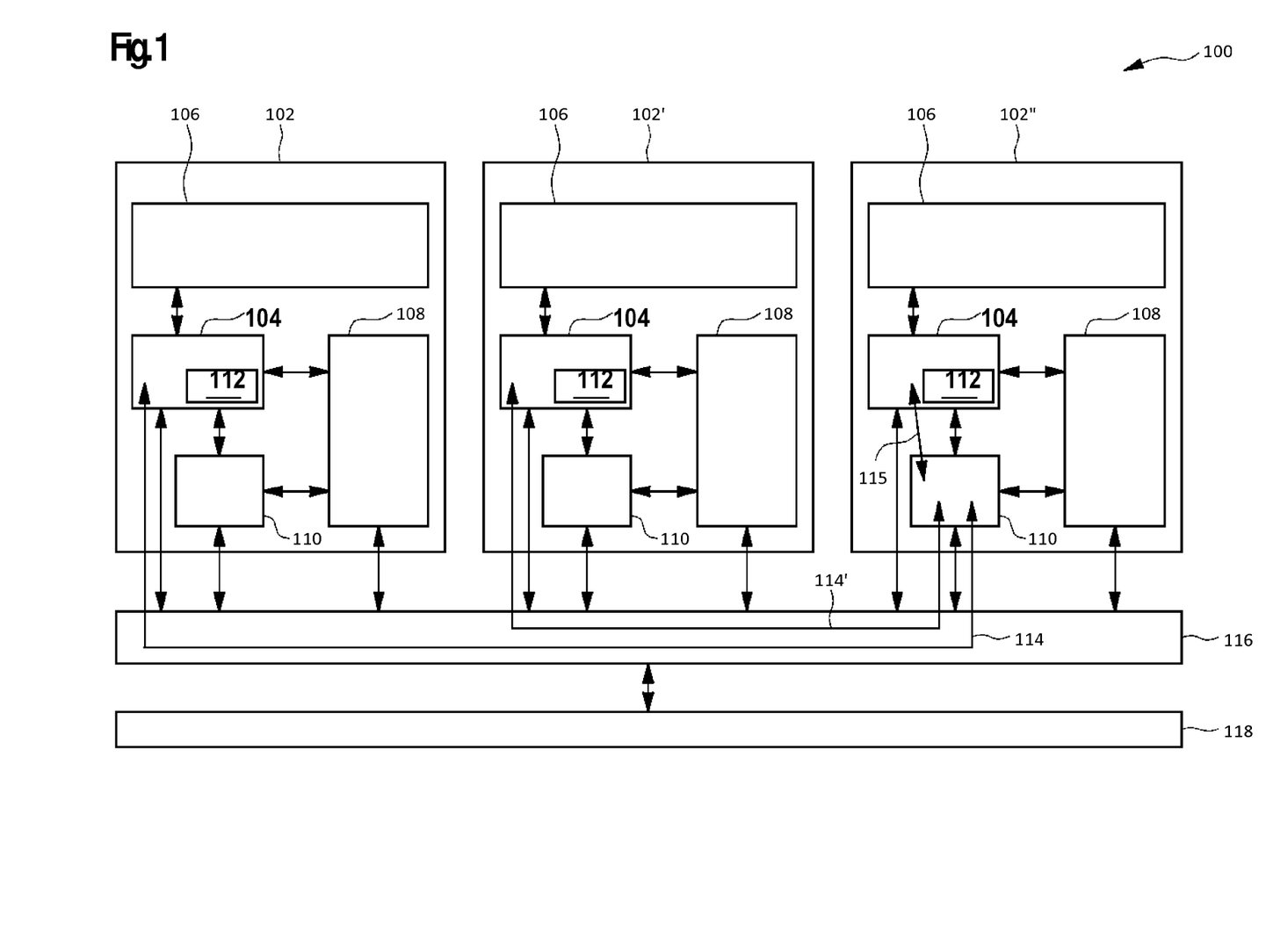
FIG. 1 illustrates an example of a processor.

FIG. 1 shows an example of a processor 100. The processor 100 is shown as containing several processor cores 102, 102', 102". In the processor cores 102, 102', 102" the processor registers are not shown. Additional common features of the processor cores 102, 102', 102" are also not shown.

Each processor core 102, 102', 102" is shown as containing a load store unit 104. The load store unit is operable for executing memory commands to exchange data between a cache 108 and the at least one processor register. The load store unit 104 is shown as being connected to an instruction unit 106. The instruction unit 106 provides instructions for execution by the load store unit 104. The load store unit 104 is shown as being further connected to a cache 108. The cache is operable for storing at least one cache line of memory. The load store unit 104 is also shown as being connected to an atomic memory operation unit 110. The atomic memory operation unit is operable for executing an atomic memory operation on the at least one cache line of memory. The load store unit 104 is further shown as having a high throughput register 112. The high throughput register 112 is shown as being a component of the load store unit; however this may be a separate register located outside of the load store unit 104 that is accessible to the load store unit.

The high throughput register 112 is able to indicate a high throughput status or a normal status. When the high throughput status is present and the load store unit 104 receives an instruction to perform an atomic memory operation then the atomic memory operation is passed to a chosen or designated processor core. In this example the processor core 102 has an arrow drawn that shows the transfer of an atomic memory operation to the atomic memory operation unit 110 of core 102". The core 102" is the designated processor core. This transfer is indicated by the arrow marked 114 and is performed via a bus 116. In this example also the processor core 102' has an arrow drawn that shows the transfer of an atomic memory operation to the atomic memory operation unit 110 of the designated core 102". This transfer is indicated by the arrow marked 114' and is performed via a bus 116. The bus 116 is operable for exchanging data between the multiple processor cores 102, 102', 102". The bus 116 is also operable for exchanging data with a lower cache or caches 118 and/or DRAM or other computer memory.

If the high throughput register 112 is set to a normal status then the load store units of the atomic memory operation unit 110 execute the atomic memory operation unit without passing it to the designated processor core 102". In this example the processor core 102" has an arrow drawn that shows the transfer of an atomic memory operation to the local atomic memory operation unit 110. This transfer is indicated by the arrow marked 115. This transfer occurs directly within the processor core 102", without use of the bus 116.

Figure 2:
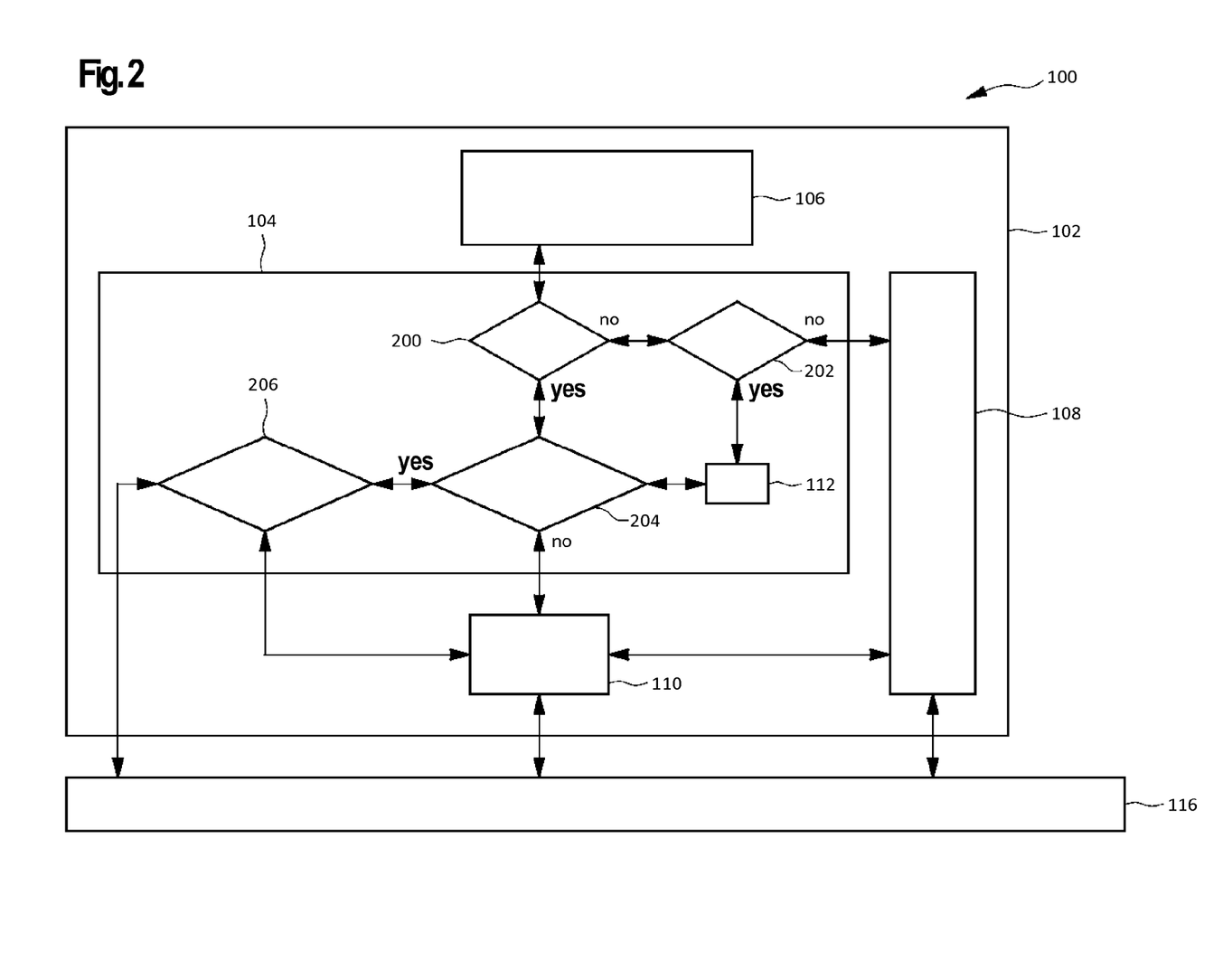
FIG. 2 illustrates a further example of a processor.

FIG. 2 shows a functional diagram of the processor core 102. Within the load store unit 104 are shown several decision boxes 200, 202, 204, 206 which are used to illustrate the internal functioning of the load store unit 104. First an instruction or command is received from the instruction unit 106. Then in decision box 200 a determination is made if the command or instruction is an atomic memory operation. If the case is no then it proceeds to box number 202. In decision box 202 a determination is made if the command or instruction is to set the high throughput register to the high throughput status or possibly a normal status. If the command is not a command to set the state of the high throughput register then the load store unit 104 accesses the cache 108 and performs the command or operation. If in fact it is the command to set the state of the high throughput register then in box 202 the state of the high throughput register 112 is set.

Returning back to decision box 200, if it is in fact that the command or operation received from the instruction unit 106 is an atomic memory operation the method proceeds to box number 204. In box 204 the high throughput register is queried. If the high throughput register is set to the normal status then the atomic memory operation is passed to the atomic memory operation unit 110. After checking the status or state of the high throughput register the high throughput register 112 is cleared. By clearing the high throughput register the register is set to the normal status.

If the high throughput register was determined to be the high throughput status then the method proceeds to box number 206. In box 206 a determination is made what is the designated processor core of the atomic memory operation unit 110 that should perform the atomic memory operation. If it is determined that the local atomic memory operation unit 110 should perform the operation then the atomic memory operation is passed directly to the atomic memory operation unit 110. If it is determined that the designated processor core is a different processor core then the atomic memory operation is passed via the bus 116 directly to the atomic memory operation unit 110 of the designated processor core. The identification or determination of the designated processor core can be performed in several different ways. It may be set explicitly for instance the high throughput status may include an identification or indication of a particular processor core. In other cases a hash function or other function may be used to process the address of the atomic memory operation to make a determination of the processor core.

Figure 3:
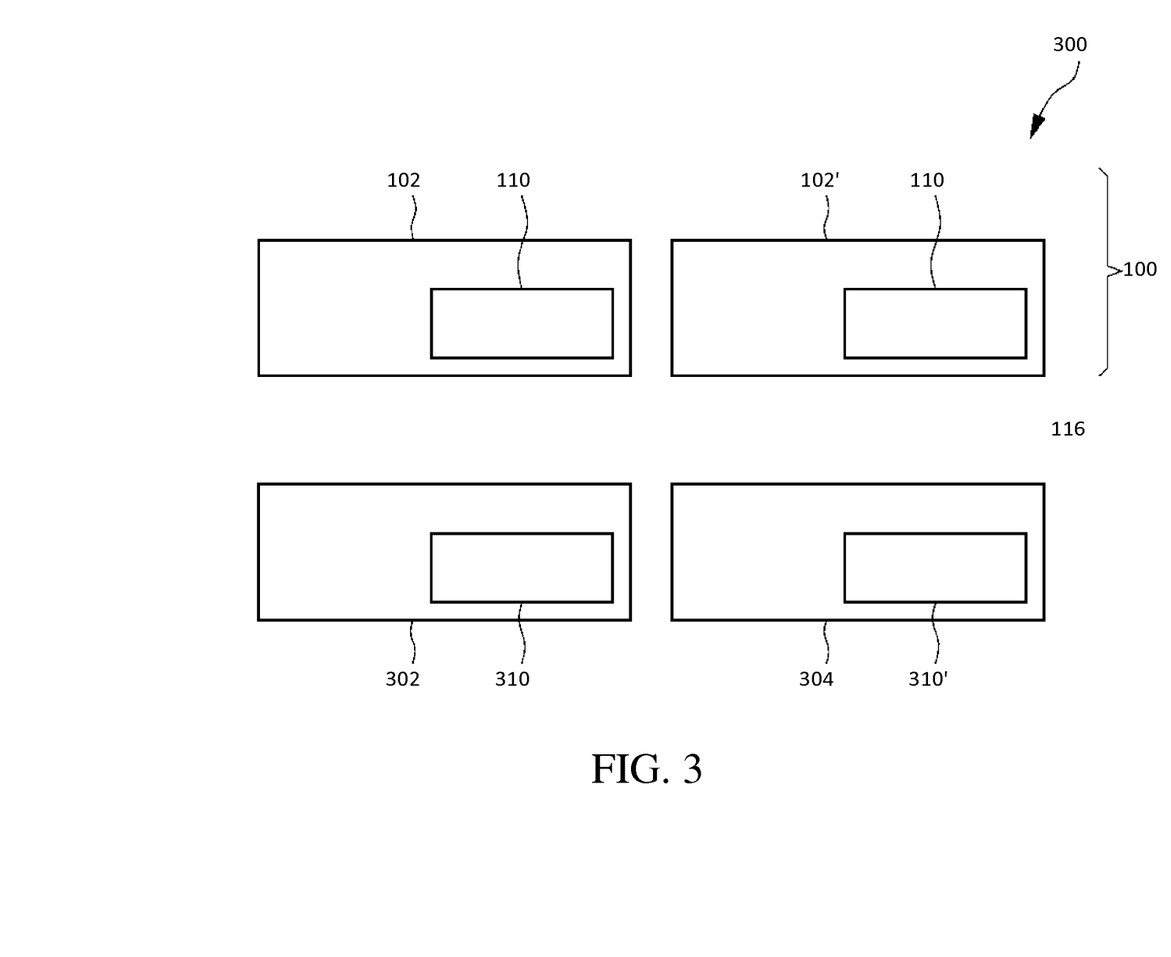
FIG. 3 illustrates an alternate implementation of the processor.

FIG. 3 shows an alternate implementation of the processor. In this case the processor 100 is incorporated into a computing device 300. The bus 116 also connects the processor 100 with a memory controller 302 and a network device 304. As an alternative to passing an atomic memory operation to an atomic memory operation unit 110 of a designated processor core the atomic memory operation may also be passed to an atomic memory operation unit 310 located within the memory controller 302 or an atomic memory operation unit 310' within a network device 304.

Figure 4:
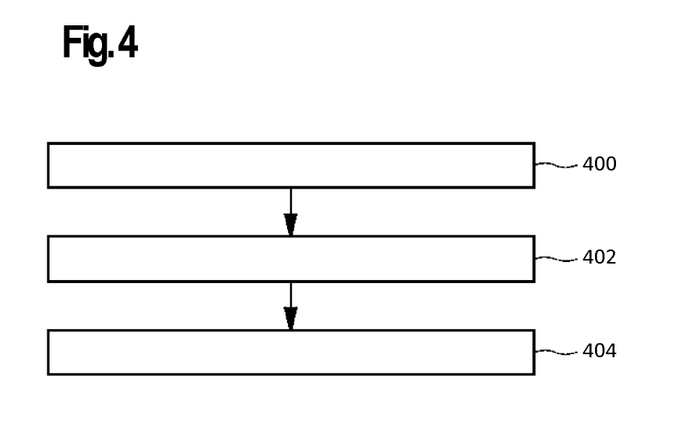
FIG. 4 shows a flow diagram which illustrates a method of operating a processor.

FIG. 4 shows a flow diagram which illustrates a method of operating a processor 100 as shown in FIG. 1. First in step 400 the status is set to the high throughput status on one or more of the multiple processor cores. Next in step 402 one or more atomic memory operations are issued that operate on the memory address on the one or more of the multiple processor cores. Then in step 404 the one or more atomic memory operations are executed using each of the one or more of the multiple processor cores.

Figure 5:
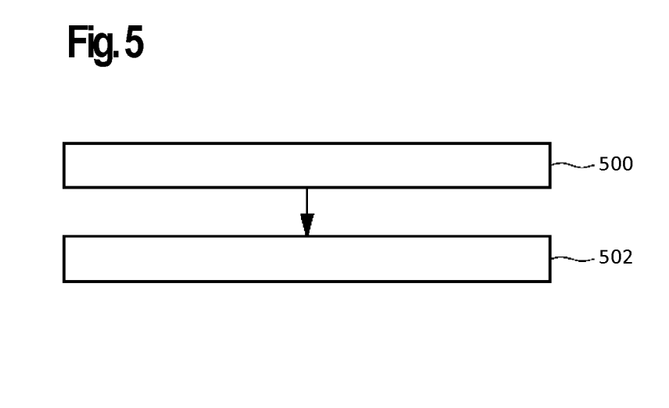
FIG. 5 shows a flow diagram which illustrates a method of compiling program data into processor instructions.

FIG. 5 shows a flowchart which illustrates an example of a further method. The method may be executed by a computer system. The computer system may execute compiler instructions for implementing a compiler. The compiler is operable for generating code to be processed by a processor 100 as shown in FIG. 1. In the first step of the method the compiler instructions cause the computer system to receive program data. The program data specifies the status setting memory command before issuing a multi-thread atomic memory operation. Then next in step 502 the compiler instructions cause the computer system to compile the program data into the processor instructions. The processor instructions are for execution by a processor 100 as shown in FIG. 1.

Figure 6:
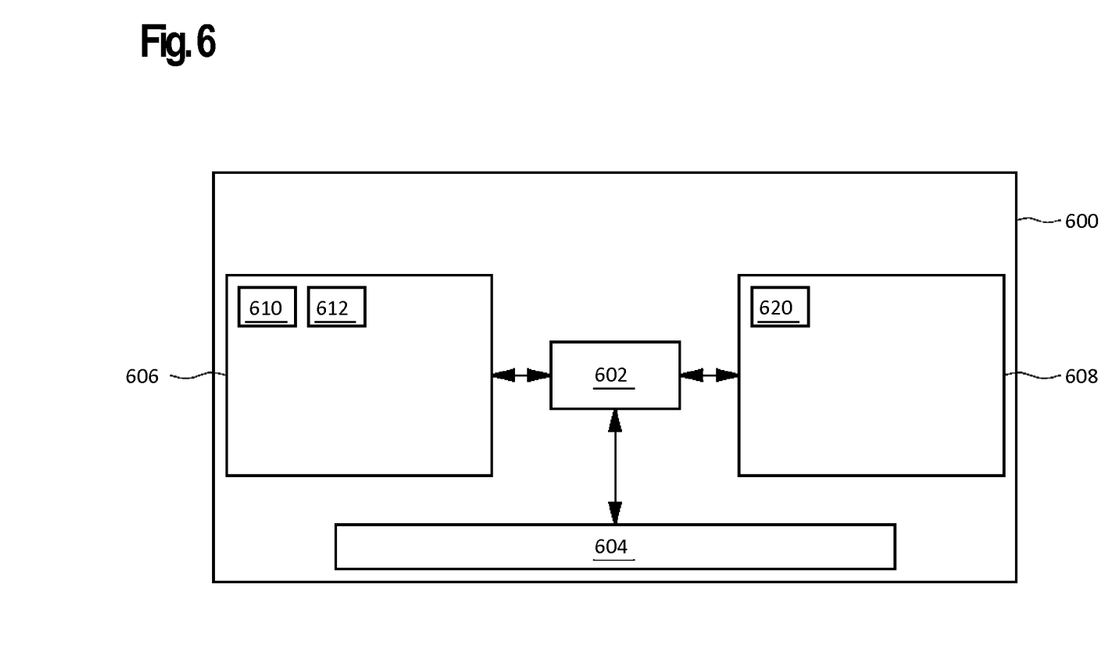
FIG. 6 illustrates an example of a computer system.

FIG. 6 shows an example of a computer 600. The computer comprises a processor 602 in communication with an interface 604, computer storage 606, and computer memory 608. Within the computer storage 606 there are program data 610. The program data 610 is data which is operable to be compiled into executable code by a compiler. The computer storage 606 is further shown as containing processor instructions 612. The processor instructions 612 are the output of a compiler that has compiled the program data 610. The computer memory 608 is shown as containing compiler instructions 620. The compiler instructions 620 contain computer-executable code for implementing the method shown in FIG. 5. That is to say the compiler instructions 620 cause the processor 602 to compile the program data 610 into the processor instructions 612.

LIST OF REFERENCE NUMERALS

100 processor
102 processor core
102' processor core
102" processor core
104 load store unit
106 instruction unit
108 cache
110 atomic memory operation unit
112 high throughput register
114 transfer of atomic memory operation
114' transfer of atomic memory operation
115 transfer of atomic memory operation
116 bus
118 lower cache(s) and/or DRAM
200 decision box
202 decision box
204 decision box
206 decision box
300 computing device
302 memory controller
304 network device
310 atomic memory operation unit
310' atomic memory operation unit
600 computer
602 processor
604 user interface
606 computer storage
608 computer memory
610 program data
612 processor instructions
620 compiler instructions

The invention claimed is:

1. A processor comprising multiple processor cores and a bus configured to exchange data between the multiple processor cores, wherein each of the multiple processor cores comprises:
   at least one processor register;
   a cache configured to store at least one cache line of memory;
   a load store unit configured to execute a memory command to exchange data between the cache and the at least one processor register;
   an atomic memory operation unit configured to execute an atomic memory operation on the at least one cache line of memory; and
   a high throughput register configured to store a status that indicates a high throughput status or a normal status, wherein the high throughput register affects the speed of the multiple processor cores;
   wherein the load store unit is further operable to transfer the atomic memory operation to the atomic memory operation unit of a designated processor core selected from the multiple processor cores in the event the atomic memory operation status is the high throughput status, wherein the load store unit is further operable to transfer the atomic memory operation to the designated atomic memory operation unit using the bus.

2. The processor of claim 1, wherein the load store unit is further operable to check if the memory command is an atomic memory operation and wherein the load store unit is further operable to detect the status.

3. The processor of claim 2, and wherein the load store unit is further operable to detect the status if the memory command is an atomic memory operation, wherein the load store unit is further operable to set the high throughput register to the normal status after detecting the status.

4. The processor of claim 1, wherein the atomic memory operation unit is further operable to execute the memory command if the status is the normal status and the memory command is an atomic memory operation.

5. The processor of claim 1, wherein the load store unit is operable to retrieve the at least one cache line of memory via the bus from a memory address specified in the memory command, wherein the load store unit is further operable to determine the designated processor core by applying a function to the memory address.

6. The processor of any one of claim 1, wherein the high throughput register is operable to store an atomic memory operation unit identifier for specifying the designated atomic memory operation unit, and wherein the load store unit is further operable to select the designated atomic memory operation unit using the atomic memory operation unit identifier.

7. The processor of claim 6, wherein the load store unit is further operable to receive an identifier setting command, wherein execution of the identifier setting memory causes the load store unit to store the atomic memory operation unit identifier in the high throughput register.

8. The processor of claim 1, wherein the bus is operable to transfer multiple memory commands to the other atomic memory operation unit in parallel.

9. The processor of claim 1, wherein each of the multiple processor cores has multiple hardware threads, wherein each of the multiple processor cores is operable to implement simultaneous multithreading with the multiple hardware threads, wherein each of the multiple processor cores has a high throughput register dedicated to each of the multiple hardware threads.

10. The processor of claim 1, wherein the load store unit is further operable to receive a status setting memory command, wherein execution of the status setting memory command causes the load store unit to set the status to the high throughput status.

11. The processor of claim 10, wherein the status setting memory command is a no-operation command on an alternative implementation of the processor.

12. A method of operating a processor comprising multiple processor cores, wherein the processor comprises a bus for exchanging data between the multiple processor cores, wherein each of the multiple processor cores comprises at least one processor register, each of the multiple processor cores further comprises a cache for storing at least one cache line of memory, each of the multiple processor cores further comprises a load store unit for executing a memory command to exchange data between the cache and the at least one processor register, each of the multiple processor cores further comprises an atomic memory operation unit for executing an atomic memory operation on the at least one cache line of memory, each of the multiple processor cores further comprises a high throughput register for storing a status that indicates a high throughput status or a normal status, wherein the high throughput status affects the speed of the multiple processor cores, and the load store unit is further operable to transfer the atomic memory operation to the atomic memory operation unit of a designated processor core selected from the multiple processor cores in the event the atomic memory operation status is the high throughput status, the load store unit is further operable to transfer the atomic memory operation to the designated atomic memory operation unit using the bus, wherein the method comprises:

setting the status to the high throughput status on one or more of the multiple processor cores;

issuing one or more atomic memory operations that operates on a memory address on the one or more of the multiple processor cores; and executing the one or more atomic memory operations using each of the one or more of the multiple processor cores.

13. A non-transitory computer readable storage medium comprising compiler instructions executable by a processor to perform a method of operating multiple core processors, the method comprising:

storing, via a high throughput register, a status that indicates a high throughput status or a normal status, wherein the high throughput register affects the speed of the multiple processor cores;

transferring an atomic memory, via a load store unit, to an atomic memory operation unit of a designated processor core selected from the multiple core processors in the event the atomic memory operation status is the high throughput status, wherein the high throughput status affects the speed of the multiple processor cores; and transferring an atomic memory operation, via the load store unit, to the designated atomic memory operation unit using a bus.

* * * * *